L. W. BUGBEE.
ILLUMINATING APPARATUS.
APPLICATION FILED AUG. 7, 1916.
1,342,894.
Patented June 8, 1920.
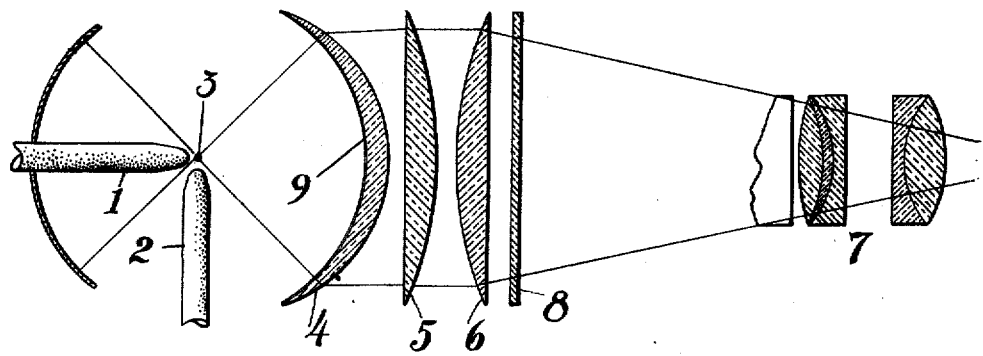
Fig. I
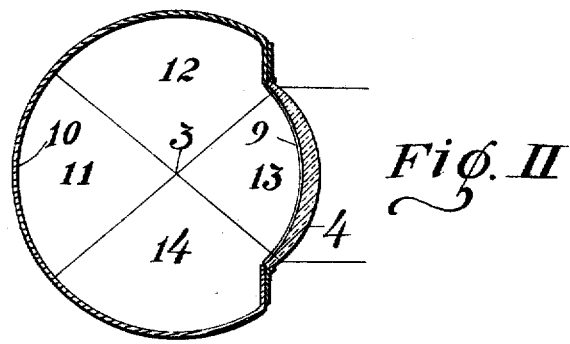
Fig. II
WITNESSES:
INVENTOR
LUCIAN W. BUGBEE
BY
ATTORNEYS

UNITED STATES PATENT OFFICE.

LUCIAN W. BUGBEE, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

ILLUMINATING APPARATUS.

1,342,894.     Specification of Letters Patent.     Patented June 8, 1920.

Application filed August 7, 1916. Serial No. 113,525.

*To all whom it may concern:*

Be it known that I, LUCIAN W. BUGBEE, a citizen of the United States, residing at Southbridge, in the county of Worcester and State of Massachusetts, have invented certain new and useful Improvements in Illuminating Apparatus, of which the following is a specification.

My invention relates to improvements in illumination and means for producing the same, and has for its principal object the provision of improved illumination producing means which shall attain maximum efficiency from the energy employed, and which will to a great degree eliminate the needless waste of energy in the form of heat during the production of illumination.

One of the further objects of my invention is the provision of an improved source of illumination which shall emit a substantially cold light, and hence is especially applicable to projection apparatus or the like, requiring intense condensing illumination, and in which fire danger has hitherto been present on account of the heat radiations present in such intense illumination, and will at the same time permit of the elimination of light and heat absorbing water cells or the like, such as it has previously been necessary to employ in connection with motion picture or similar projection apparatus.

A further primary and important object of the present invention is the provision of means for producing illumination which shall serve not only to produce light radiations while stopping off a large percentage of the heat radiations, but which shall in addition focus back or re-utilize these heat radiations in the production of additional illumination, producing at the one time a cold light and an extremely bright or intense light as respects the amount of energy consumed in its production.

Other objects and advantages of my invention should be readily apparent by reference to the following specification taken in connection with the accompanying drawing illustrating the application of my invention to a projection system, for which it has been mentioned it is particularly adaptable, although it will be understood that my invention may be utilized for production of illumination for any other desired purpose, and particularly through the utilization of the principles illustrated in Figure II, for example, and it will further be understood that I may make any modifications in the specific details of my structure shown and described within the scope of the appended claims and the principles of my invention as hereinafter disclosed, without departing from or in anywise exceeding the spirit of my invention.

Fig. I illustrates a semi-diagrammatic view of one embodiment of my projection system embodying the principles of my invention.

Fig. II represents a sectional view illustrating a modified form of reflector.

In the drawings, the numerals 1 and 2 denote respectively the positive and negative carbons of an electric arc light system which it will be understood are adapted to be connected with a suitable source of electrical energy to produce an illuminating arc at the point 3.

In connection with this arc there is employed, as is customary in systems of this character, a compound condensing lens system comprising for example the lenses 4, 5 and 6, and, arranged a suitable distance therefrom, the projection lens system denoted as a whole by the numeral 7, the picture 8 to be projected being located intermediate the condensing and projecting systems in the usual manner.

In the various forms of projection apparatus in use prior to my invention difficulty has been experienced on account of the heat generated by the light or source of illumination employed in order that sufficient final illumination might be present to properly project the picture.

The most common form of projection system in use has been that in which a series of water cells or the like have been interposed in the path of rays from the source of illumination to the projection system, said water cells serving to absorb a certain percentage of the heat while in addition it has usually been found necessary to provide a stage cooling water cell which shall be in contact or substantially in contact with the picture or slide to be subjected and which serves both through absorption and conduction to lead away the heat from the object and to absorb said heat.

In addition considerable difficulty is frequently experienced in preventing breakage of the condensing system on account of the stream of hot gases from the arc which are liable to strike the upper part of the condenser and unequally heat the same, a special screen or the like being usually provided to obviate this difficulty.

By the use of my present invention, however, I am able to get away from the difficulties above outlined and in addition to produce a greater amount of illumination from a given initial source, in that my improved system does away with condensing and other water cells with the interposed screens, etc., which have hitherto absorbed both light and heat, and in addition focuses or condenses the heat at the point of the arc and thus increases the intensity of illumination automatically as the heat from continued use of the projecting arc or the like increases.

In the accomplishment of these results I form the initial condensing lens 4 of deep meniscus type. This formation possesses a double advantage in that it provides for a relatively short radius of curvature of the inner face of the lens and at the same time on account of its curved or meniscus formation will collect and deflect into the remainder of the condensing system a greater arc of divergent rays from the source of illumination than could be collected by a plano or substantially plain type of lens.

By reference to Figs. I and II it will be noted that the system is so arranged that the point of illumination or intersection of the axes of the carbons 1 and 2 at 3 is located at the geometrical center of curvature of the inner face of the collecting lens 4, while said collecting lens is formed or provided at its inner face with my improvement, which consists in part in the application to the inner face of the lens, or face directed toward the source of illumination, of a thin film of gold or similar material, said film having the property of transmission of visible light radiations, and at the same time having the property of retardance by reflection of the infra red rays or radiations at the red or heat end of the spectrum.

The great advantage of this construction should be readily apparent, in that it will be understood that as the point 3 is located at the center of curvature of the meniscus collecting or condensing lens 4 which thus serves both as a condensing lens and a condensing mirror, all of the heat rays will be reflected back from the inner film surface 9 and will be condensed upon the point 3 or in other words added to the arc stream which flows between the carbons and is thereby delivered to the points of the carbons 1 and 2 forming the poles of the arc, and will greatly increase the incandescence or intensity of heat at these points and thus proportionately increase the amount of illumination to be obtained for the same voltage.

In Fig. II, I illustrate a form of device of greater efficiency, in which the source of illumination is the same as in Fig. I, but the point 3 is the center of a spherical metallic or other mirror 10 having, as indicated by the quadrants 11, 12 and 14, a reflecting surface of which the area is considerably in excess of the area of a hemisphere, and of which the focus is the point 3. The condensing lens 4 with the metallic film 9 on it focuses at the center point 3 the heat rays which are reflected from the film.

In the case of projection apparatus it is desirable that all of the light be emitted through the condensing lens 4, and consequently the mirror or reflector 10 is made of opaque material which combines with the metallic coating to form a mirror or reflector for both light and heat rays. The heat rays cannot escape, and are condensed or focused at the proper point to aid in producing illumination. The light beam which passes directly forward through the lens 4 is reinforced by the beam which is reflected only once from the surface opposite the lens and indicated by the quadrant 11, and also by the rays reflected from the other surfaces of the reflector 10 until they eventually pass out through the lens 4, the only path of escape for the light rays.

While I have particularly described and illustrated my invention for use in connection with the projection of illustrative slides or the like, it will be understood that it is adapted for either projection of this character, for use as a search light or the like, or for any desired purpose, the essential advantages attained being the production of maximum efficient illumination with the expenditure of a minimum quantity of energy, and the projection of what may properly be termed a cold light, that is to say, a light having no deleterious or heating effect, and one which may consequently be employed with the greatest of safety in connection with inflammable substances.

I claim:

1. A projection system, comprising a curved reflector and a meniscus condenser lens, both having their center of curvature at the same point, and a source of light adjacent said point, the inner face of said lens having a coating with the property of selective reflection of infra red rays and selective transmission of visible rays.

2. A projection system, including a source of luminosity, a reflector for directing the radiations from the source in a condensed beam, a condenser lens system in the path of the beam, and means included in said system for eliminating the infra-red rays by selective retardance, said means including a transparent body member and a transparent film carried by said body member.

3. As an article of manufacture, a meniscus condenser lens adapted for use in a projection system, said lens being provided with a transparent metallic film having the properties of transmission of visible radiations and selective retardance of invisible radiations, said film being of sphero form, whereby the lens may be mounted in a condenser system, a radius length from the source of luminosity of such system, and will serve to condense back the invisible radiations onto the source of luminosity, substantially as and for the purpose described.

4. In a projection system, a light source comprising a body rendered incandescent by heat, a meniscus condensing lens having its inner surface provided with a coating which transmits rays of the visible spectrum and reflects infra red rays and having its center of curvature optically disposed at a point immediately adjacent the said body where the concentrated infra red rays reflected by said coating will increase the temperature of said body, and a spherical reflector having an opaque metallic reflecting surface and mounted with its center of curvature at said point and directly opposite said lens.

5. In a projection system, a substantially spherical bulb having a reflecting coating extending over the major portion thereof and a small light emitting area, a meniscus lens having its center of curvature optically disposed at the center of said bulb and having on its inner face a coating which transmits light rays and reflects heat rays, and a light emitting body located in said bulb with a portion which is rendered incandescent to constitute a concentrated source of light, and which is slightly off the center point of said bulb.

6. In an illuminating device, a radiant, a reflecting section, a light emitting section, a transparent media located in the path of the rays from the light emitting section, and means for selectively retarding the light waves immediately associated with said transparent media.

7. An illuminating device including a source of luminosity, a reflector for directing the radiations from the source in a beam, a condenser lens system in the path of the beam, and means included in said system for eliminating the infra-red rays by selective retardance, said means including a solid transparent body member and non-fluid means incorporated therewith transparent as to visible radiations and retardant as to infra-red radiations.

8. In an illuminating device, a radiant and a spherical media surrounding the radiant, comprising an opaque polished sector adapted to reflect all types of rays back onto the radiant, and an emission sector having a metallic film thereon adapted to transmit the visible rays and reflect back the heat rays onto the radiant.

9. In an illuminating device, a radiant, a polished reflector behind the radiant adapted to reflect back all the rays from the radiant, a light transmitting media in front of the radiant, and a metallic film thereon adapted to transmit the visible rays and to reflect the heat rays from the radiant.

In testimony whereof I affix my signature in the presence of two witnesses.

LUCIAN W. BUGBEE.

Witnesses:
    EDITH M. HALVORSEN,
    JOSEPH J. DEMERS.